C. B. HUTCHINS.
CORN LOOM.
APPLICATION FILED FEB. 7, 1913.
1,130,603.
Patented Mar. 2, 1915.
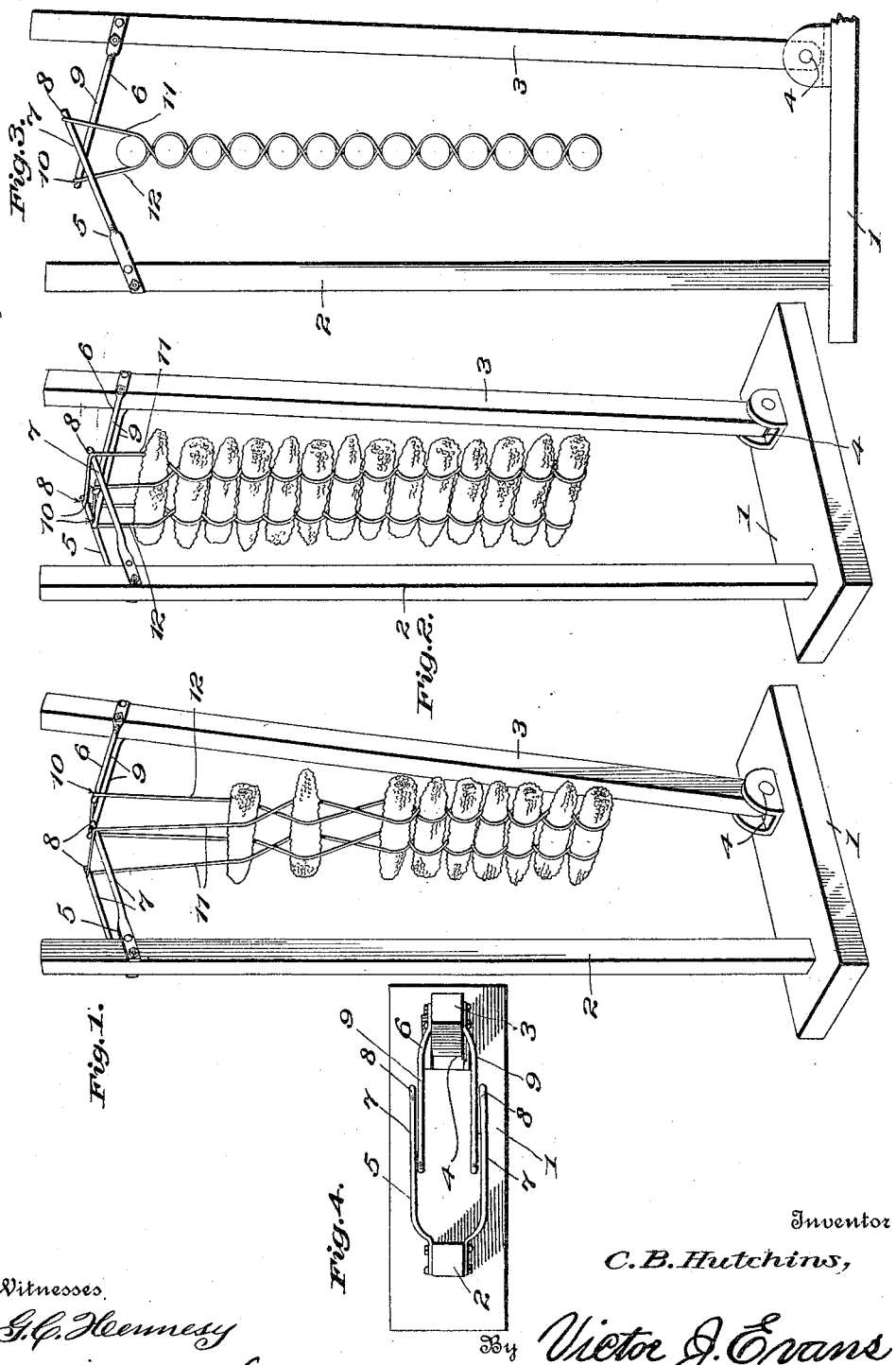

UNITED STATES PATENT OFFICE.

CLAYTON B. HUTCHINS, OF ALGONA, IOWA.

CORN-LOOM.

1,130,603.  Specification of Letters Patent.  Patented Mar. 2, 1915.

Application filed February 7, 1913. Serial No. 746,898.

*To all whom it may concern:*

Be it known that I, CLAYTON B. HUTCHINS, a citizen of the United States, residing at Algona, in the county of Kossuth and State of Iowa, have invented new and useful Improvements in Corn-Looms, of which the following is a specification.

This invention relates to a corn loom, or machine for weaving seed corn into bundles, which may be conveniently suspended until it is desired to use the corn.

The object of the invention is to provide a simple and effective machine or device, whereby ears of seed corn may be bound together by portions of twine which are interwoven to hold the ears assembled, and by means of which a compact bundle of ears may be formed and the bundle suspended by means of the binding twine.

The invention consists of the features of construction, combination and arrangement of parts hereinafter fully described and claimed, reference being had to the accompanying drawings, in which:—

Figure 1 is a perspective view of the apparatus showing the parts in normal position, and also showing a number of ears which are being bound or woven into a bundle. Fig. 2 is a similar view showing the movable stand moved toward the fixed stand, during a stage of the weaving operation. Fig. 3 is a sectional elevation, showing the parts arranged as in Fig. 2, and illustrating clearly the mode in which the ears of corn are woven or bound together. Fig. 4 is a top plan view of the device, showing the weaving forks.

The device comprises a suitable base 1, from which rise stands 2 and 3. The stand 2 is preferably mortised or otherwise fixed at its lower end in the base, while the other stand 3 is hinged or pivoted, as at 4, to the base, for movement toward or from said stand 2. When the stand 3 is in normal position, it is inclined outwardly and upwardly at a slight angle to the perpendicular, and is adapted to be moved inwardly to or slightly beyond a perpendicular position, and to automatically drop back by gravity to normal position, when not adjusted inwardly to a position beyond the center of gravity.

The stands 2 and 3 are provided at their upper ends with weaving forks 5 and 6, respectively. These forks preferably incline inwardly and upwardly at a slight angle, and the arms 7 of the fork 5 are provided at their free ends with notches 8, while the arms 9 of the fork 6 are provided at their free ends with similar notches 10. The arms 7 of the fork 5 are spaced a greater distance apart than the arms 9 of the fork 6, and are arranged at a somewhat higher general elevation, so that on the inward movement of the stand 3 toward the stand 2 the arms 9 will pass below the free ends of the fork arms 5 and thence upwardly between the same.

In the notches 8 and 10 of the respective sets of fork arms 7 and 9 are designed to be placed the upper bight portions of a pair of looped binding cords or twine 11 and 12, which in practice depend down between the respective stands 2 and 3. In the operation of bundling or weaving a series of ears of corn 13 together, the first ear is fitted in the lower bights of the looped cords, after which the cords are arranged in crossing relation, a second ear of corn placed between the cords above the crossing point, and the cords again crossed and another ear of corn inserted above the crossing point, and so on until a desired number of ears of corn are thus woven or bound together by the loops formed between the crossed portions of the strands of the cords. When the cords are filled, or the desired number of ears of corn are bound together, the upper end of one of the looped cords is passed through the other, thus forming a tie or bond holding the ears asembled, and the free end of the second named cord is employed as a suspending member whereby the bundle of ears may be hung from a suitable support. In thus weaving or tying the ears of corn together, after the first or bottom ear has been placed in position, in the practical operation of the device, and when the standards are in the open position shown in Fig. 1, an ear is placed in the depending loops and standard 3, is then moved toward the standard 2, thus crossing the strands over the first ear, and a second ear is placed above the crossed strands, this action being repeated until the cords are filled. After the top ear of corn has been applied, the upper or free portion of one of the binding cords is passed through the other to form a bond or tie, and may be utilized as a suspending element to hang the bundle of corn from a support.

It will, of course, be understood that the stands 2 and 3 may be made of any desired length according to the lengths of the binder cords to be used and the number of ears of corn to be bound together in a bundle, and that the weaving forks may be disposed at different elevations upon the stands as circumstances may require.

It will be seen that the construction described provides a hand operated corn weaving loom whereby ears of seed corn or other articles may be quickly, conveniently and compactly formed into bundles adapted to be suspended from a suitable support, and that bundles of corn or other articles of this character may be easily and quickly formed.

I claim:—

A device for bundling or weaving ears of corn comprising a base, a fixed standard rising from the base, a weaving fork upon the upper end of said fixed standard, said fork being inclined at an upward and inward angle of inclination and having its arms provided with cord receiving notches, a second standard hinged at its lower end to the base for movement toward and from the fixed standard, said second standard being adapted to tilt by gravity to a normally inclined position in a direction away from the fixed standard, and a weaving fork upon the upper end of the hinged standard for coöperation with the fork upon the fixed standard, said fork upon the hinged standard being also inclined at an upward and inward angle and having its arms provided with cord receiving notches, the said forks being adapted for relative movement on converging lines and the fork upon the hinged standard being movable between the arms of the fork upon the fixed standard, substantially as and for the purpose described.

In testimony whereof I affix my signature in presence of two witnesses.

CLAYTON B. HUTCHINS.

Witnesses:
 ULYSSES G. WHITNEY,
 LEWIS L. BINGHAM.

Copies of this patent may be obtained for five cents each, by addressing the "Commissioner of Patents, Washington, D. C."